United States Patent
Fraczek et al.

(10) Patent No.: US 10,781,956 B2
(45) Date of Patent: Sep. 22, 2020

(54) CONNECTION APPARATUS FOR TELESCOPIC JOINT

(71) Applicant: Ameriforge Group Inc., Houston, TX (US)

(72) Inventors: Justin Fraczek, Houston, TX (US); Waybourn Anderson, Houston, TX (US); Alex Gidman, Houston, TX (US); Julio Garza, Houston, TX (US)

(73) Assignee: AMERIFORCE GROUP INC., Houston, TX (US)

( * ) Notice: Subject to any disclaimer, the term of this patent is extended or adjusted under 35 U.S.C. 154(b) by 22 days.

(21) Appl. No.: 15/947,264

(22) Filed: Apr. 6, 2018

(65) Prior Publication Data

US 2018/0292037 A1 Oct. 11, 2018

Related U.S. Application Data

(60) Provisional application No. 62/482,531, filed on Apr. 6, 2017.

(51) Int. Cl.
*F16L 37/18* (2006.01)
*F16L 37/138* (2006.01)
(Continued)

(52) U.S. Cl.
CPC ............ *F16L 37/138* (2013.01); *E21B 17/01* (2013.01); *E21B 17/073* (2013.01);
(Continued)

(58) Field of Classification Search
CPC ..... F16L 37/101; F16L 37/0841; F16L 37/18; F16L 21/08; E21B 17/046
(Continued)

(56) References Cited

U.S. PATENT DOCUMENTS 2,463,179 A * 3/1949 Iftiger, Sr. ............... F16L 37/10 285/34
2,916,143 A * 12/1959 McConalogue ....... B01D 35/30 210/236
(Continued)

FOREIGN PATENT DOCUMENTS

FR 433001 A * 12/1911 ............ F16L 37/101

OTHER PUBLICATIONS

International Search Report and Written Opinion issued in International Patent Application No. PCT/US2018/026508, dated Jul. 2, 2018.

*Primary Examiner* — David Bochna
(74) *Attorney, Agent, or Firm* — Norton Rose Fulbright US LLP (57) ABSTRACT

Various connection devices and assemblies, such as telescoping riser joints, can include at least one of the present connection devices. Some of the present connection devices, for example, include a housing having a bore therethrough; a locking ring rotatably movable relative to the housing between a first position and a second position; and an engagement member laterally moveable relative to the bore of the housing between a retracted position and an extended position. In some such connection devices, the locking ring is configured such that movement from the first position to the second position causes the engagement member to move from the retracted position to the extended position.

17 Claims, 10 Drawing Sheets

(51) Int. Cl.
*E21B 17/07* (2006.01)
*F16L 37/124* (2006.01)
*E21B 17/01* (2006.01)
*E21B 17/10* (2006.01)
*E21B 17/043* (2006.01)

(52) U.S. Cl.
CPC ........ *E21B 17/1085* (2013.01); *F16L 37/124* (2013.01); *F16L 37/18* (2013.01); *E21B 17/043* (2013.01)

(58) Field of Classification Search
USPC .......................................................... 285/920
See application file for complete search history.

(56) References Cited

U.S. PATENT DOCUMENTS

| | | | | |
|---|---|---|---|---|
| 3,083,042 A * | 3/1963 | Collar | ................... | F16L 37/101 285/93 |
| 3,353,847 A * | 11/1967 | Brown | .................. | E21B 33/038 285/18 |
| 3,608,932 A * | 9/1971 | Brown | .................. | E21B 33/038 285/18 |
| 4,057,267 A * | 11/1977 | Jansen, Jr. | ............ | E21B 33/038 285/18 |
| 4,183,189 A * | 1/1980 | Keller | ................. | E02B 17/0004 52/637 |
| 4,428,433 A | 1/1984 | Watkins | | |
| 4,466,551 A * | 8/1984 | Leung | ..................... | F16J 13/08 220/293 |
| 4,615,542 A | 10/1986 | Ideno et al. | | |
| 4,722,557 A * | 2/1988 | Bormioli | ................ | F16L 37/00 285/18 |
| 5,163,514 A | 11/1992 | Jennings | | |
| 5,634,671 A | 6/1997 | Watkins | | |
| 5,947,642 A | 9/1999 | Teixeira et al. | | |
| 6,334,633 B1 | 1/2002 | Nguyen et al. | | |
| 7,077,436 B1 * | 7/2006 | Krywitsky | .............. | F16L 15/08 285/354 |
| 7,219,932 B2 * | 5/2007 | Smith, III | ............... | F16L 39/00 285/124.3 |
| 7,316,430 B2 * | 1/2008 | Biester | .................. | E21B 33/038 285/394 |
| 7,357,426 B2 * | 4/2008 | Bormioli | ................ | F16L 37/62 285/314 |
| 7,431,351 B2 * | 10/2008 | Russell | ................ | F16L 37/002 285/334.1 |
| 2008/0101872 A1 | 5/2008 | Munk et al. | | |

* cited by examiner

CONNECTION APPARATUS FOR TELESCOPIC JOINT

CROSS-REFERENCE TO RELATED APPLICATIONS

This application claims priority to U.S. Provisional Application No. 62/482,531, filed Apr. 6, 2017, the entire contents of which application is specifically incorporated by reference herein without disclaimer

FIELD OF INVENTION

The present invention relates generally to the fields of telescopic joints. More particularly, it concerns a connection apparatus for a telescopic riser joint.

BACKGROUND

Examples of telescopic joints are disclosed in U.S. Pat. Nos. 4,428,433; 4,615,542; and 6,334,633.

SUMMARY

This disclosure includes various embodiments of connection devices and assemblies, such as telescopic riser joints, that include at least one of the present connection devices.

Some embodiments of the present connection devices comprise: a housing having a bore therethrough; a locking ring rotatably movable relative to the housing between a first position and a second position; and an engagement member laterally moveable relative to the bore of the housing between a retracted position and an extended position; where the locking ring is configured such that movement from the first position to the second position causes the engagement member to move from the retracted position to the extended position. In some embodiments, the locking ring includes a protrusion configured to engage the engagement member when the locking ring is in the second position and the engagement member is in the extended position. In some embodiments, the locking ring includes a second protrusion configured to engage the engagement member when the locking ring is in the first position and the engagement member is in the retracted position.

Some embodiments of the present connection devices comprise: a housing having a bore therethrough; a locking ring rotatably movable relative to the housing between a first position and a second position, where the locking ring includes an inner protrusion and an outer protrusion; and an engagement member laterally moveable relative to the bore of the housing between a retracted position and an extended position; where, when the engagement member is in the retracted position, the engagement member is configured to engage the outer protrusion of the locking ring and, when the engagement member is in the extended position, the engagement member is configured to engage the inner protrusion of the locking ring. In some embodiments, the locking ring is configured to be rotatably movable relative to a longitudinal axis of the housing.

In some embodiments of the present connection devices, the locking ring includes a toothed profile configured to mate with a gear. In some embodiments, the outer protrusion of the locking ring includes an sloped surface configured to engage the engagement member.

In some embodiments of the present connection devices, the engagement member is laterally movable through an opening defined by the housing.

In some embodiments of the present connection devices, the housing includes: an inner cylindrical projection; an outer cylindrical projection; and an annular recess between the inner cylindrical projection and the outer cylindrical projection. In some embodiments, when the engagement member is in the retracted position, an end of the engagement member is configured to be substantially flush with an inner surface of the inner cylindrical projection. In some embodiments, the housing includes a disc portion extending from the outer cylindrical portion.

In some embodiments of the present connection devices, the engagement member includes a channel extending from a first side of the engagement member to a second side of the engagement member and the locking ring is configured to be movable within the channel when the locking ring moves between the first position and the second position. In some embodiments, the engagement member includes an inner protrusion and an outer protrusion extending into the channel.

Some embodiments of the present assemblies comprise: a first pipe; a second pipe; and a connection device configured to be coupled to the first pipe. In some such embodiments, the connection device comprising: a housing having a bore therethrough; a locking ring rotatably movable relative to the housing between a first position and a second position; an engagement member laterally moveable relative to the bore of the housing between a retracted position and an extended position; and where, the locking ring is configured such that movement from the first position to the second position causes the engagement member to move from the retracted position to the extended position, and, when the engagement member is in the extended position, the engagement member is configured to couple the connection device to the second pipe. In some embodiments, the first pipe is configured to be coupled to an upper end of the housing of the connection device. Some embodiments further comprise a third pipe, where the third pipe is configured to be coupled to a lower end of the housing of the connection device. In some embodiments, the second pipe and the third pipe are configured to be telescopic.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Referring now to the drawings, shown therein and designated by the reference numeral 10 is one embodiment of the present connection apparatuses. As will be described in more detail below, in the embodiment shown, apparatus 10 includes a housing 14, a locking ring 18, and a plurality of engagement members 22 configured to be movable between a retracted position (FIGS. 2 and 3) and an extended position (FIGS. 4 and 5).

Figure 7:
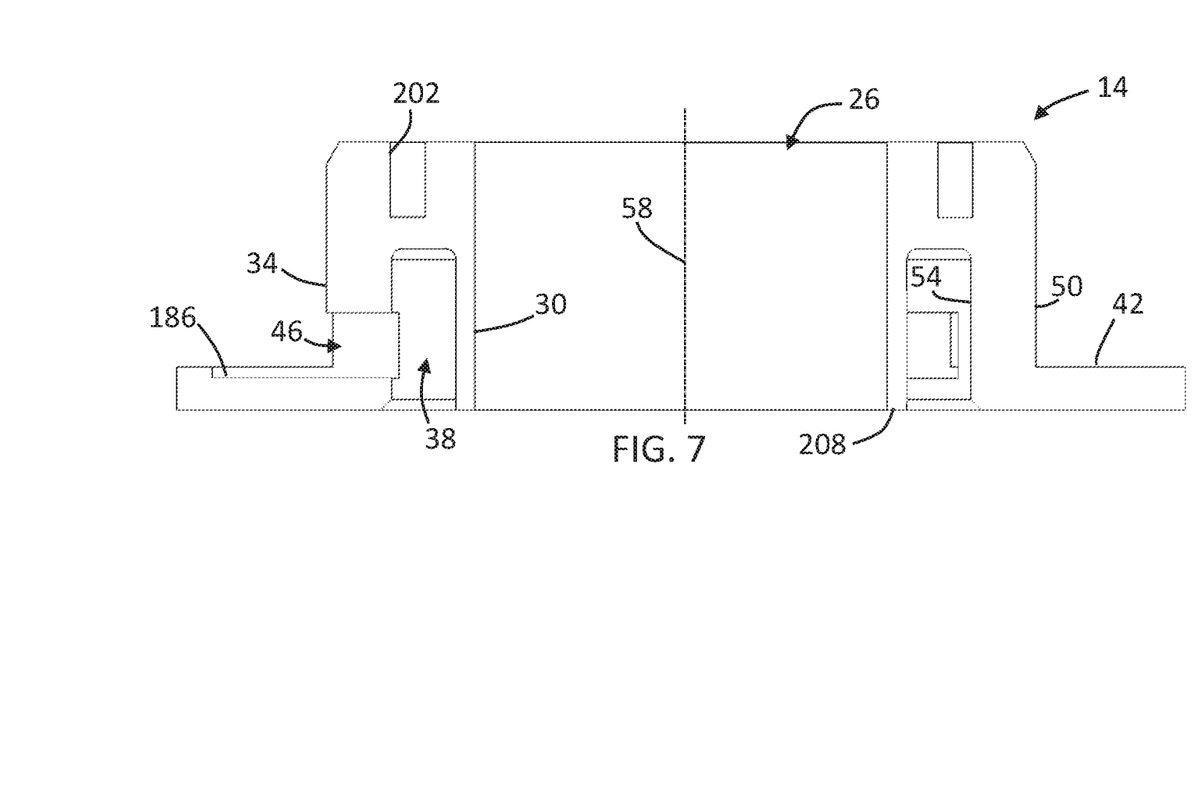
Figures 8, 9, 10:
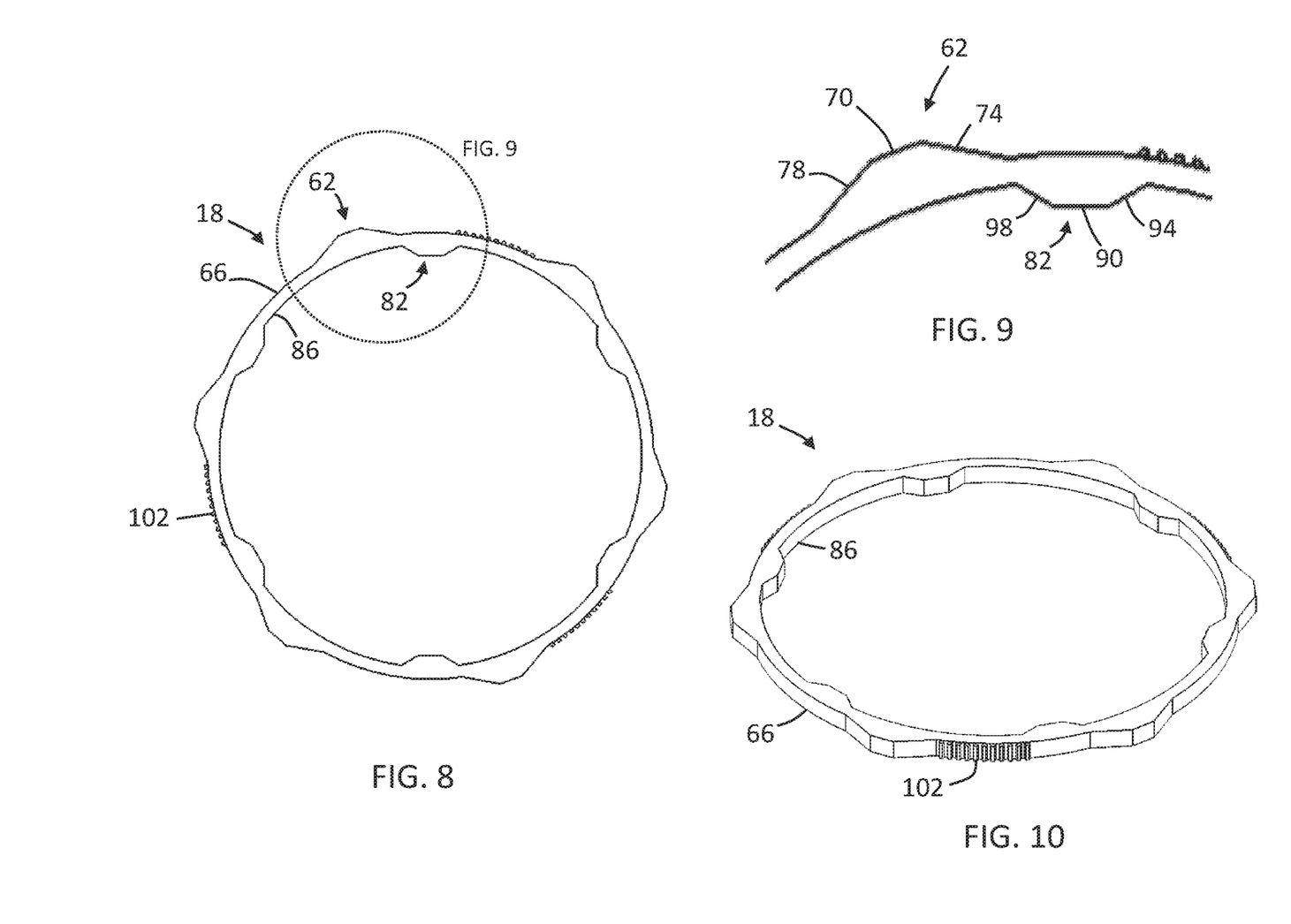
FIGS. 8-10 are top, magnified, and perspective views, respectively, of the locking ring of FIG. 1.
Figure 11:
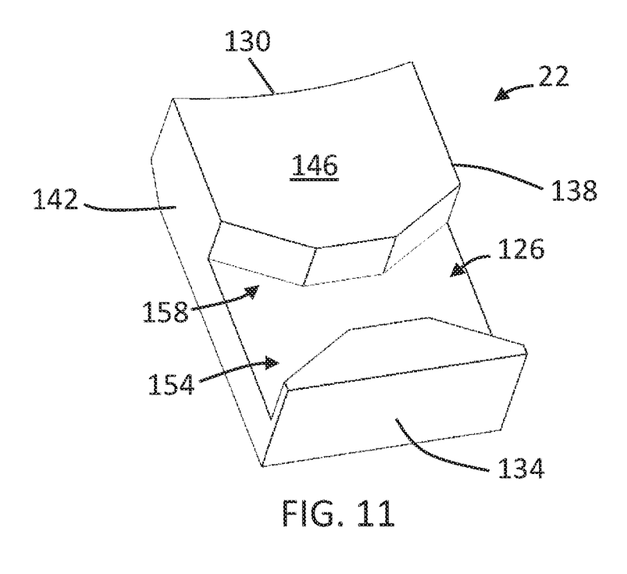
FIGS. 11-13 are perspective, first side, and second side views, respectively, of one of the plurality of engagement members of FIG. 1.
Figure 12:
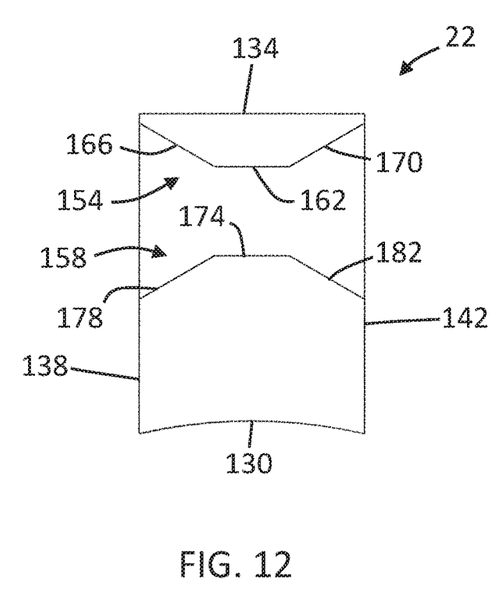
Figure 13:
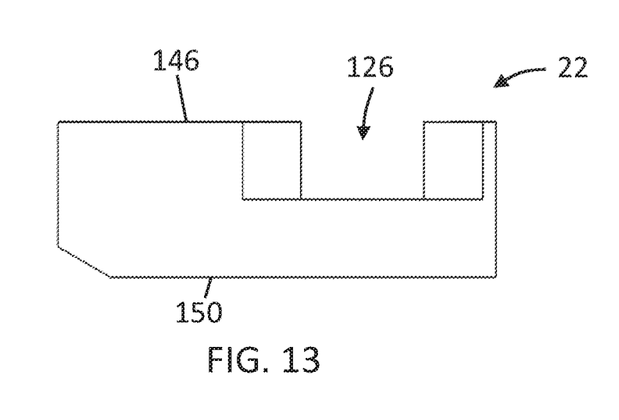

In the depicted embodiment, housing 14 may include a bore 26 extending longitudinally through the housing. As shown, housing 14 may comprise an inner cylindrical projection 30, an outer cylindrical projection 34, and an annular recess 38 between the outer cylindrical projection and the inner cylindrical projection. In this embodiment, housing 14 may include a disc portion 42 extending laterally outward (e.g., away from bore 26 of the housing) from outer cylindrical projection 34. As shown, disc portion 42 may be integral with outer cylindrical projection 34. In other embodiments, a housing (e.g., 14) may include a disc portion (e.g., 42) coupled to an outer cylindrical projection (e.g., 34). In the embodiment shown, housing 14 may include a plurality of openings 46 (e.g., six openings, as shown) arranged circumferentially on outer cylindrical projection 34. In other embodiments, a housing (e.g., 14) may include any appropriate number of openings (e.g., 46) such as, for example, 2, 3, 4, 5, 6, 7, 8, 9, or 10 openings. As shown in FIG. 7, each opening 46 extends laterally through outer cylindrical projection 34 from an outer surface 50 of the outer cylindrical projection to an inner surface 54 of the outer cylindrical projection.

As shown, apparatus 10 includes locking ring 18 disposed around outer cylindrical projection 34. In this embodiment, locking ring 18 may be configured to be (e.g., rotatably) movable relative to (e.g., a longitudinal axis 58 of) housing 14 between a first position (e.g., FIG. 2) and a second position (e.g., FIG. 4). In the depicted embodiment, locking ring 18 includes a plurality of outer protrusions 62 (e.g., six protrusions, as shown) arranged circumferentially on an outer surface 66 of the locking ring. In other embodiments, a locking ring (e.g., 18) may include any appropriate number of outer protrusions (e.g., 62) such as, for example, 2, 3, 4, 5, 6, 7, 8, 9, or 10 outer protrusions. As shown, each outer protrusion 62 may include an retraction lock surface 70 at an apex of the respective outer protrusion. More particularly, one or more outer protrusion(s) 62 may include a (e.g., substantially planar) retraction lock surface 70 at the apex of the respective outer protrusion. As shown, one or more outer protrusion(s) 62 may include a first sloped surface 74 extending between retraction lock surface 70 and outer surface 66 and a second sloped surface 78 extending between the retraction lock surface and the outer surface of locking ring 18.

In this embodiment, locking ring 18 includes a plurality of inner protrusions 82 (e.g., six protrusions, as shown) arranged circumferentially on an inner surface 86 of the locking ring. In other embodiments, a locking ring (e.g., 18) may include any appropriate number of inner protrusions (e.g., 82) such as, for example, 2, 3, 4, 5, 6, 7, 8, 9, or 10 inner protrusions. As shown, one or more inner protrusion(s) 82 may include an (e.g., substantially planar) extension lock surface 90 at an apex of the respective inner protrusion. In this embodiment, one or more inner protrusion(s) 82 may include a first sloped surface 94 extending between extension lock surface 90 and inner surface 86 of locking ring 18 and a second sloped surface 98 extending between the extension lock surface and the inner surface of the locking ring. In the depicted embodiment, locking ring 18 may include one or more toothed portions 102 (e.g., three toothed portions, as shown). In this embodiment, one or more toothed portion(s) 102 may be disposed on outer surface 66 of locking ring 18. In other embodiments, a locking ring (e.g., 18) may include one or more toothed portion(s) (e.g., 102) on an inner surface (e.g., 86) of the locking ring. In this embodiment, one or more toothed portion(s) 102 are configured to mate with a respective pinion gear 106.

Figures 17, 18:
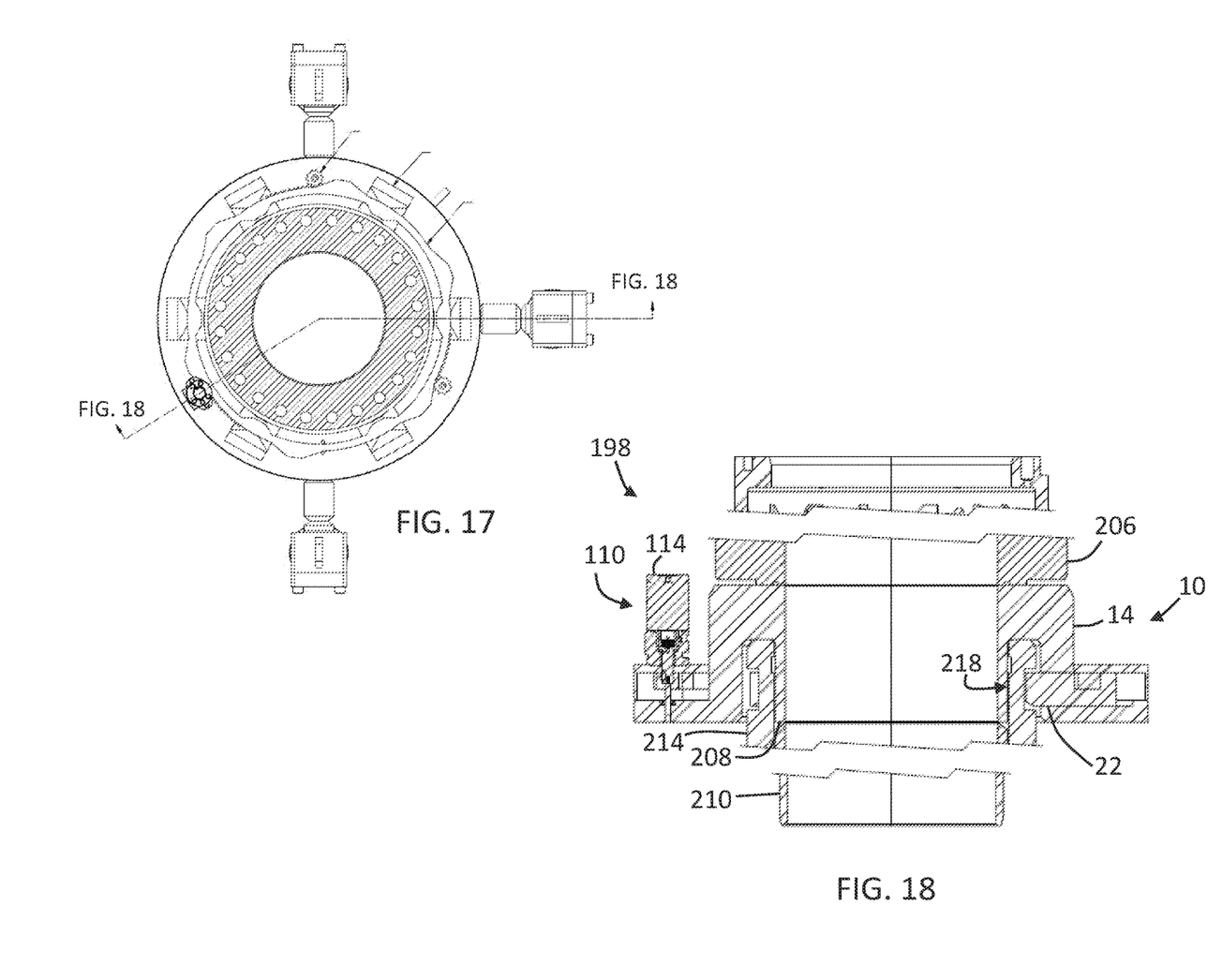
FIGS. 17 and 18 are first and second cross-section views of respective portions of the assembly of FIGS. 15 and 16.

In this embodiment, one or more pinion gear(s) 106 (e.g., three pinion gears, as shown) are disposed on disc portion 42 of housing 14. In other embodiments, an apparatus (e.g., 10) may include any appropriate number of pinion gears (e.g., 106) such as, for example, 2, 3, or 4 pinion gears. As shown, at least one pinion gear 106 may be configured to be coupled to a drive system 110, as shown in FIGS. 17 and 18. In this embodiment, drive system 110 includes a hydraulic motor 114 configured to rotate pinion gear 106 in a clockwise direction 118 (e.g., from the perspective of FIGS. 2 and 4) and/or a counterclockwise direction 122 (e.g., from the perspective of FIGS. 2 and 4). For example, hydraulic motor 114 may include a first port in fluid communication with a first hydraulic fluid line and a second port in fluid communication with a second hydraulic fluid line. In the depicted embodiment, for example, supplying hydraulic fluid to the first port (e.g., via the first hydraulic fluid line) may actuate motor 114 in a first direction, thereby causing pinion gear 106 to rotate in clockwise direction 118. In turn, pinion gear 106 (e.g., via the mated engagement with toothed portion 102 of locking ring 18) may cause the locking ring to rotate in counterclockwise direction 122 (e.g., thereby moving the locking ring from the first position towards the second position). Conversely, supplying hydraulic fluid to the second port (e.g., via the second hydraulic fluid line) may actuate motor 114 in a second direction, thereby causing pinion gear 106 to rotate in counterclockwise direction 122. In turn, pinion gear 106 (e.g., via the mated engagement with toothed portion 102 of locking ring 18) may cause the locking ring to rotate in clockwise direction 118 (e.g., thereby moving the locking ring from the second position towards the first position).

In the depicted embodiment, apparatus 10 includes three pinion gears 106 configured to mate with a corresponding number of toothed portions 102 (e.g., three). In other embodiments, an apparatus (e.g., 10) may include any appropriate number of pinion gears (e.g., 106) configured to mate with a corresponding number of toothed portions (e.g., 102) of a locking ring (e.g., 18) such as, for example, 1, 2, 3, 4, 5, or more pinion gears. In other embodiments, one or more pinion gear(s) (e.g., 106) may be coupled to any other suitable drive system (e.g., 110) having any appropriate motor (e.g., 114), such as, for example, a synchronous alternating current (AC) motor, asynchronous AC motor, brushed direct current (DC) motor, brushless DC motor, permanent magnet DC motor, and/or the like.

In the depicted embodiment, apparatus 10 may include a plurality of engagement members 22 (e.g., six engagement members, as shown) circumferentially arranged on disc portion 42 and configured to be (e.g., laterally) movable through respective openings 46 of housing 14 between a retracted position (FIGS. 2 and 3) and an extended position (FIGS. 4 and 5). In other embodiments, an apparatus (e.g., 10) may include any appropriate number of engagement members (e.g., 22) (e.g., corresponding to a number of openings (e.g., 46)) such as, for example, 2, 3, 4, 5, 6, 7, 8, 9, or 10 engagement members.

In this embodiment, one or more engagement member(s) 22 may include a channel 126 configured to permit (e.g., rotational) movement of locking ring 18 relative to the engagement member. Channel 126 may (e.g., also) be configured to restrain lateral movement of the locking ring relative to bore 26 of housing 14. In the depicted embodiment, housing 14 may (e.g., also) include restraining pins 130 on disc portion 42 configured to restrain lateral movement of locking ring 18 relative to bore 26 of the housing.

As shown, channel 126 may be disposed between a first end 130 and a second end 134 of engagement member 22 and/or the channel may extend from a first side 138 to a second side 142 of the engagement member. In the depicted embodiment, channel 126 extends into an upper side 146 of engagement member 22 (e.g., towards a lower side 150 of the engagement member).

In the depicted embodiment, engagement member 22 includes an outer protrusion 154 and an inner protrusion 158 extending into channel 126. As shown, outer protrusion 154 extends towards first end 130 of engagement member 22 (e.g., laterally inward toward bore 26 of housing 14). In this embodiment, outer protrusion 154 includes a (e.g., substantially planar) retraction lock surface 162 at an apex of the outer protrusion. As shown, outer protrusion 154 may include a first sloped surface 166 extending between retraction lock surface 162 and first side 138 of engagement member 22 and a second sloped surface 170 extending between the retraction lock surface and second side 142 of the engagement member. In this embodiment, inner protrusion 158 extends toward second end 130 of engagement member 22 (e.g., laterally outward away from bore 26 of housing 14). In this embodiment, inner protrusion 158 includes an extension lock surface 174 at an apex of the inner protrusion. As shown, inner protrusion 158 may include a first sloped surface 178 extending between extension lock surface 174 and first side 138 of engagement member 22 and a second sloped surface 182 extending between the extension lock surface and second side 142 of the engagement member.

As shown, retraction lock surface 162 of outer protrusion 154 and extension lock surface 174 of inner protrusion 158 are configured to be spaced apart such that locking ring 18 may be rotatably movable in channel 126 between the retraction lock surface and the extension lock surface when the locking ring moves between the first position and the second position.

In this embodiment, locking ring 18 may be configured to interact with (e.g., engage) one or more engagement members 22 when the locking ring moves between the first position and the second position such that the (e.g., rotational) movement of the locking ring between the first position and the second position moves one or more engagement members between the retracted position and the extended position, respectively.

In the depicted embodiment, housing 14 may include a plurality of slots 186 configured to restrict circumferential and/or lateral movement of one or more engagement member(s) 22 on disc portion 42. As shown, one or more slots 186 may be arranged circumferentially on disc portion 42 of housing 14 such that at least one of the slot(s) may be circumferentially aligned with a corresponding opening 46 in the housing. In this embodiment, one or more slot(s) 186 may (e.g., also) be configured to support respective engagement members 22 and/or guide the lateral movement of the respective engagement members between the retracted position and the extended position. More particularly, one or more slot(s) 186 may be configured to guide (e.g., and align) the lateral movement of the engagement member 22 (e.g., such that the engagement member may slidably move through opening 46). In other embodiments, slots (e.g., 186) in a disc portion (e.g., 42) of a housing (e.g., 14) may be omitted.

Figure 1:
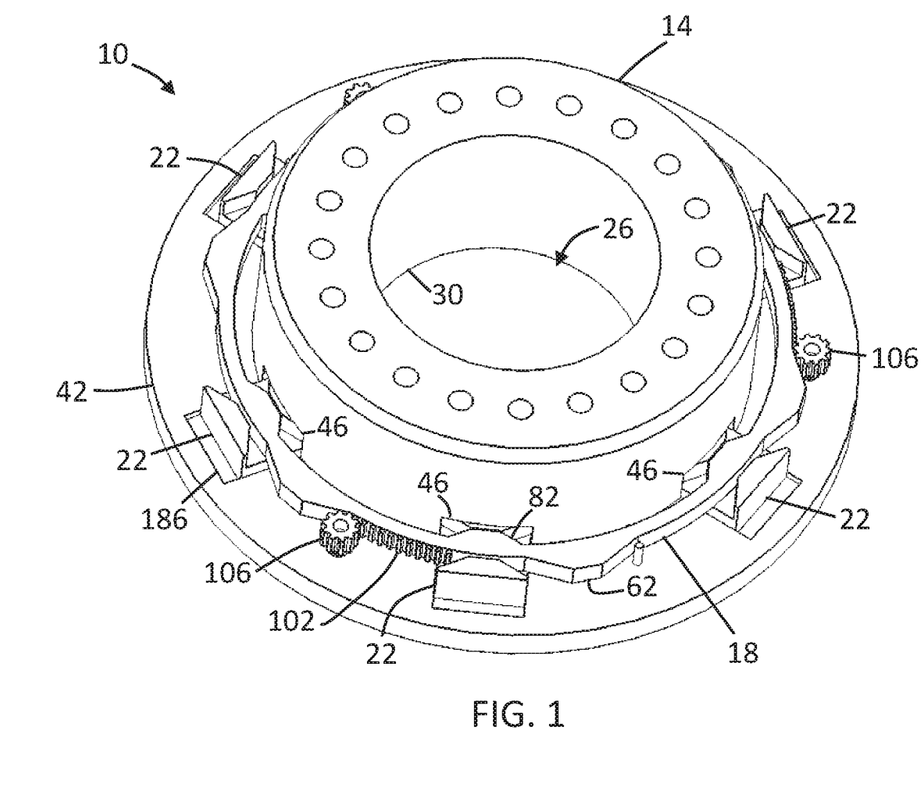
FIG. 1 is a perspective view of one embodiment of the present connection apparatuses, shown with a locking ring and a plurality of engagement members.
Figure 2:
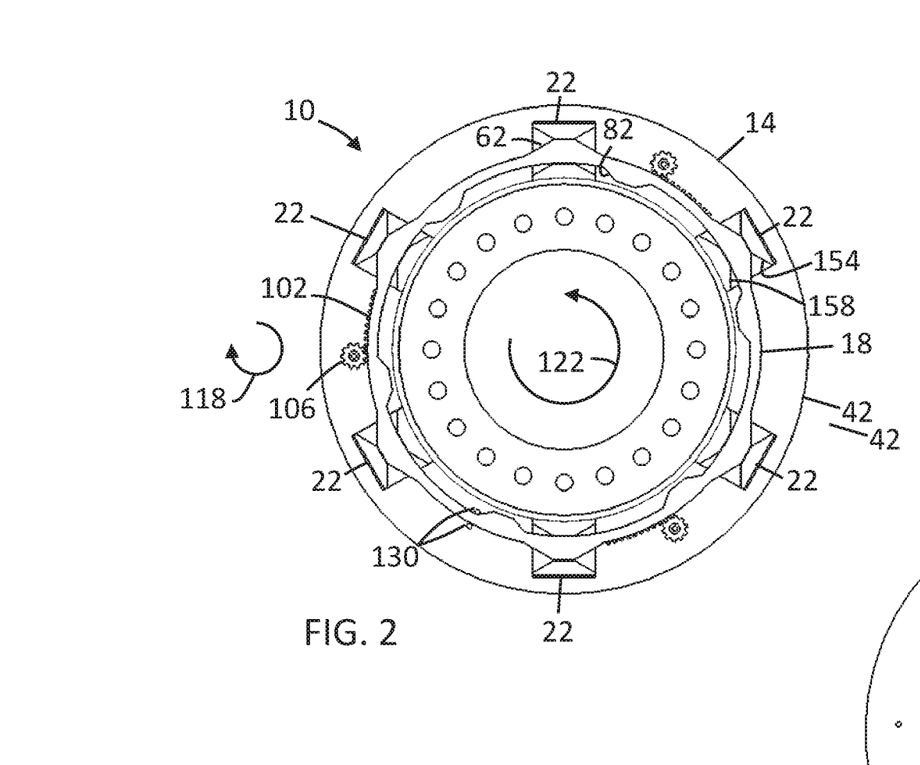
FIGS. 2 and 3 are first and second side views, respectively, of the apparatus of FIG. 1 shown with the locking ring in a first position and the plurality of engagement members in a retracted position.
Figure 3:
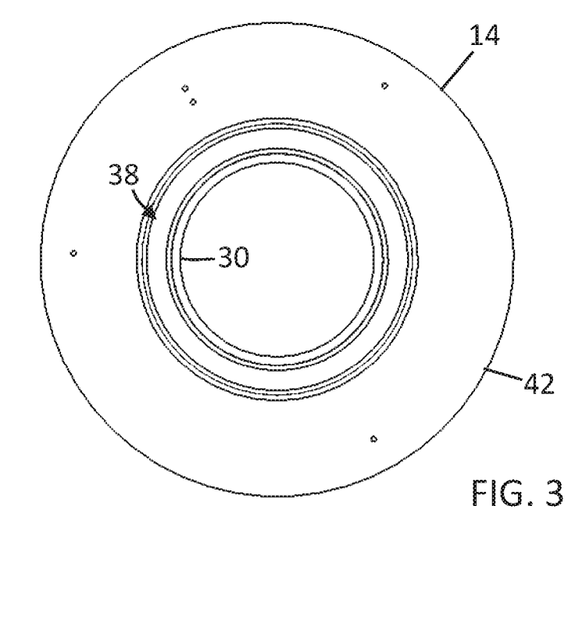
Figures 4, 5:
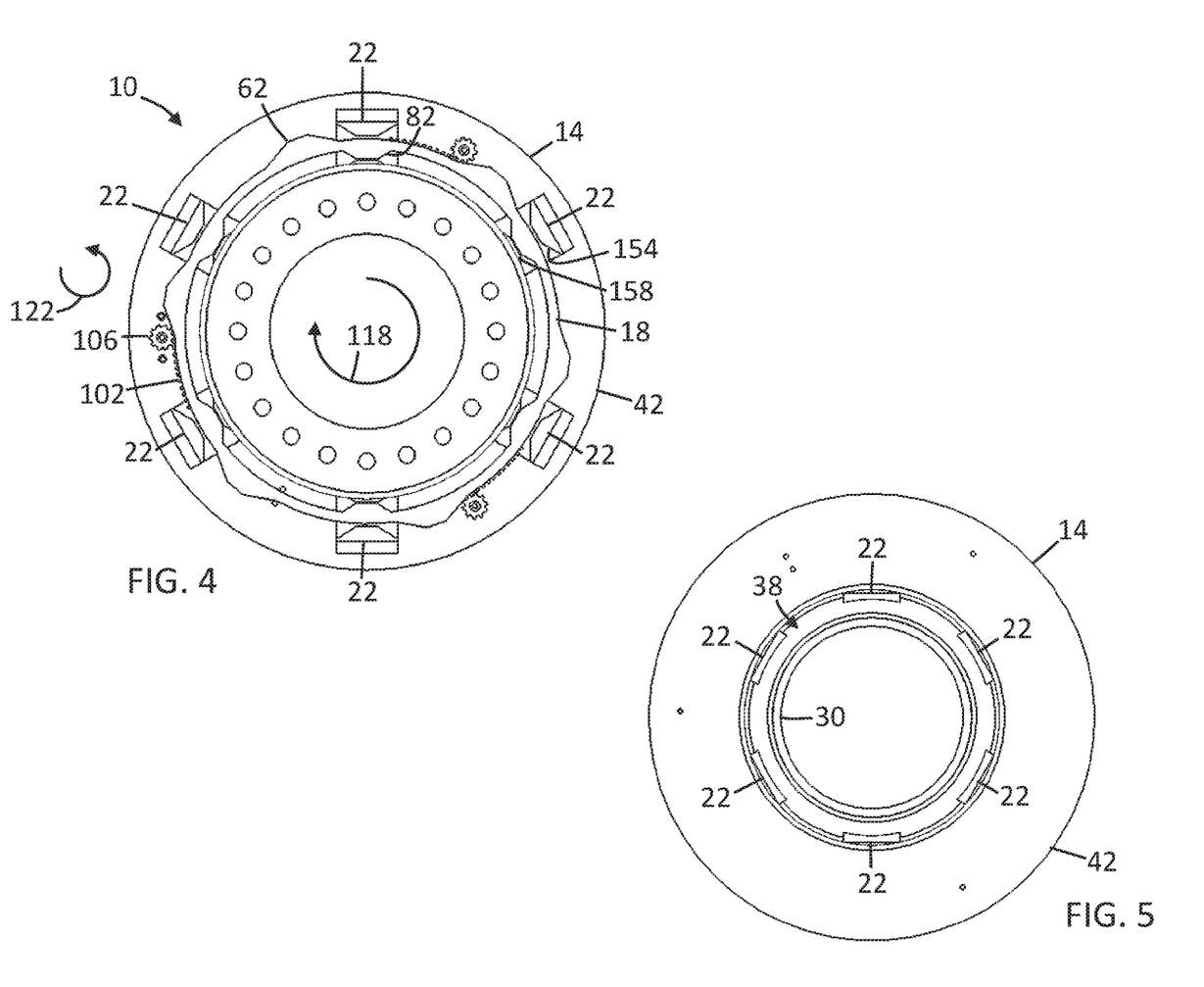
FIGS. 4 and 5 are first side and second side views, respectively, of the apparatus of FIG. 1 shown with the locking ring in a second position and the plurality of engagement members in an extended position.
Figure 6:
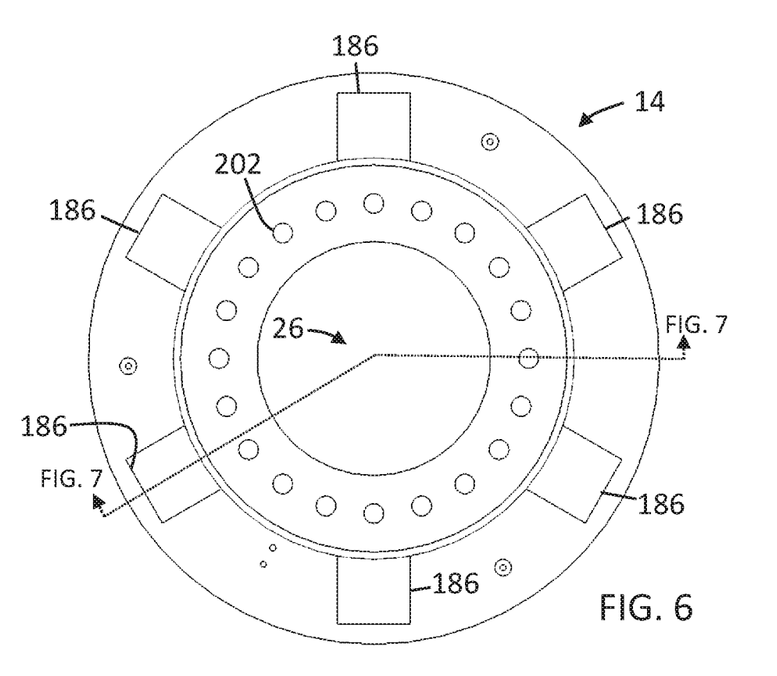
FIGS. 6 and 7 are top and cross-section views, respectively, of a housing of the apparatus of FIG. 1.

As shown in FIGS. 2 and 3, when locking ring 18 is in the first position, one or more engagement members 22 are in the retracted position. For example, when locking ring 18 is in the first position, one or more retraction lock surface(s) 70 of the locking ring may be (e.g., at least partially) engaged with respective retraction lock surface(s) 162 of respective engagement member(s) 22. When engagement members 22 are in the retracted position, at least one of the engagement members may be configured to be substantially flush relative to inner surface 54 of outer cylindrical projection 34. For example, in the embodiment shown, first end 130 of engagement member 22 may include a concave (e.g., curved) contour configured to substantially match the contour of inner surface 54 of outer cylindrical projection 34. In other embodiments, when an engagement member (e.g., 22) is in a retracted position, the engagement member may be configured to be recessed relative to an inner surface (e.g., 54) of an outer cylindrical projection (e.g., 34) of a housing (e.g., 14) such that a first end (e.g., 130) of the engagement member is disposed in an opening (e.g., 46) (e.g., between an outer surface (e.g., 50) of the outer cylindrical projection and the inner surface of the outer cylindrical projection). In yet other embodiments, when an engagement member (e.g., 22) is in the retracted position, a first end (e.g., 130) of the engagement member may be laterally spaced outward (e.g., away from a bore (e.g., 26) of a housing (e.g., 14)) relative to an outer surface (e.g., 50) of an outer cylindrical projection (e.g., 34) of the housing.

In this embodiment, to move one or more engagement member(s) 22 from the retracted position to the extended position, hydraulic motor 114 may be actuated to rotate pinion gear 106 in clockwise direction 118, as described above. In turn, pinion gear 106 moves locking ring 18 from the first position toward the second position (e.g., by rotating the locking ring in counterclockwise direction 122) (e.g., via toothed portion 102 on the locking ring). As a result, retraction lock surface 70 of locking ring 18 disengages retraction lock surface 162 of engagement member 22 as the locking ring rotates in counterclockwise direction 122 toward the second position. Thereafter, as locking ring 18 continues to move toward the second position (e.g., by rotating in counterclockwise direction 122 via pinion gear 106), second sloped surface 98 of inner protrusion 82 of the locking ring may engage second sloped surface 182 of inner protrusion 158 of engagement member 22. In turn, further (e.g., rotational) movement of locking ring 18 toward the second position may urge engagement member 22 laterally inward (e.g., toward bore 26 of housing 14). For example, second sloped surface 98 of inner protrusion 82 of locking ring 18 may slide relative to second sloped surface 182 of inner protrusion 158 of engagement member 22, and, because lateral movement of the locking ring may be restrained (e.g., via channel 126 and/or restraining pins 130) and/or circumferential movement of the engagement member may be restrained (e.g., via slot 186), the engagement member is urged laterally inward (e.g., toward bore 26 of housing 14) relative to the locking ring. In this embodiment, engagement member 22 may be urged laterally inward (e.g., toward bore 26 of housing 14) until extension lock surface 90 of locking ring 18 (e.g., at least partially) engages extension lock surface 174 of the engagement member. When extension lock surface 90 of locking ring 18 engages extension lock surface 174 of engagement member 22, the locking ring is in the second position and the engagement member is in the extended position.

As shown in FIGS. 4 and 5, when locking ring 18 is in the second position, one or more engagement member(s) 22 are in the extended position. For example, when locking ring 18 is in the second position, one or more extension lock surface(s) 90 of the locking ring may be engaged with respective extension lock surface(s) 174 of respective engagement member(s) 22. When engagement member 22 is in the extended position, the engagement member may be configured to be disposed in opening 46 and second end 134 of the engagement member may be configured to extend into annular recess 38 (e.g., the second end extends inwards past inner surface 54 of outer cylindrical projection 34).

In this embodiment, to move the plurality of engagement members 22 from the extended position to the retracted position, hydraulic motor 114 may be actuated to rotate pinion gear 106 in counterclockwise direction 122, as described above, such that locking ring 18 moves from the second position toward the first position (e.g., by rotating the locking ring in clockwise direction 118) (e.g., via toothed portion 102 on the locking ring). In this embodiment, extension lock surface 90 of locking ring 18 disengages extension lock surface 174 of engagement member 22 as the locking ring moves towards the first position (e.g., by rotating in clockwise direction 118). Thereafter, as locking ring 18 continues to move towards the first position (e.g., by rotating in clockwise direction 118), first sloped surface 74 of outer protrusion 62 of the locking ring may engage first sloped surface 166 of outer protrusion 154 of engagement member 22. In turn, further (e.g., rotational) movement of locking ring 18 toward the first position may urge engagement member 22 laterally outward (e.g., away from bore 26 of housing 14). For example, first sloped surface 74 of outer protrusion 62 of locking ring 18 may slide relative to first sloped surface 166 of outer protrusion 154 of engagement member 22, and, because lateral movement of the locking ring may be restrained (e.g., via channel 126 and/or restraining pins 130) and/or circumferential movement of the engagement member may be restrained (e.g., via slot 186), the engagement member is urged laterally outward (e.g., away from bore 26 of housing 14) relative to the locking ring. In this embodiment, engagement member 22 may be urged laterally outward (e.g., away from bore 26 of housing 14) until retraction lock surface 70 of locking ring 18 engages retraction lock surface 162 of the engagement member. When retraction lock surface 70 of locking ring 18 engages retraction lock surface 162 of engagement member 22 the locking ring is in the first position and the engagement member is in the retracted position.

In the depicted embodiment, one or more engagement member(s) 22 may be configured to support locking ring 18 while the locking ring moves between the first position and the second position. For example, as shown, locking ring 18 may be (e.g., longitudinally) supported by engagement member 22 in channel 126. In other embodiments, a locking ring (e.g., 18) may be (e.g., longitudinally) supported by a disc portion (e.g., 42) of a housing (e.g., 14) while the locking ring moves between a first position and a second position.

Figure 14:
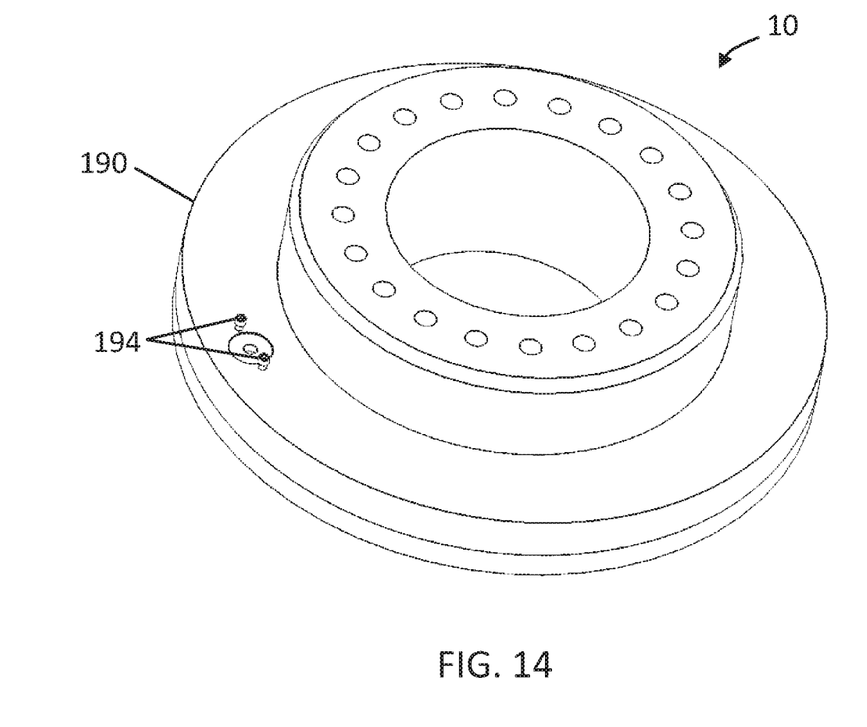
FIG. 14 is a perspective view of the apparatus of FIG. 1 shown with a protective cover.
Figure 15:
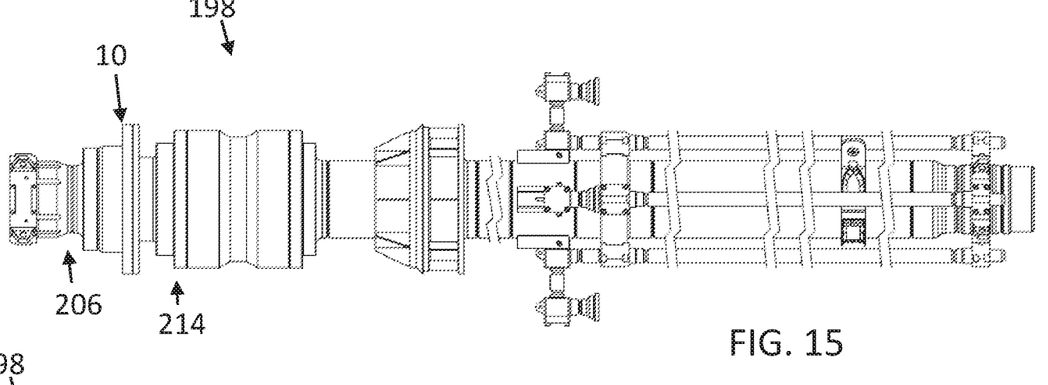
FIGS. 15 and 16 are side and cross-sectional views, respectively, of an assembly having the apparatus of FIG. 1.
Figure 16:
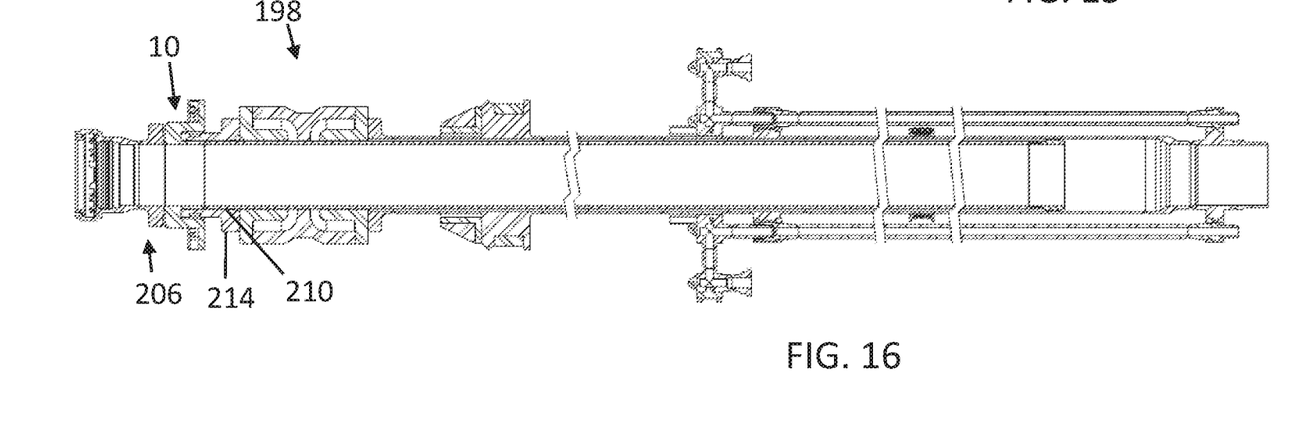

As shown in FIG. 14, apparatus 10 may comprise a protective cover 190 configured to shield one or more components of the apparatus (e.g., engagement member(s) 22, locking ring 18, pinion gear(s) 106, housing 14) from debris. In this embodiment, cover 190 may be configured to be coupled to housing 14 using one or more fasteners 194 (e.g., two fasteners, as shown), such as nuts and bolts, screws, pins, rivets, and/or the like.

As shown in FIGS. 15-18, apparatus 10 may be included as a component of a riser assembly 198. In this embodiment, apparatus 10 may be configured to be coupled to one or more other components of riser assembly 198. For example, an upper end of housing 14 may include a plurality of (e.g., threaded) holes 202 configured to receive fasteners (e.g., nuts and bolts, screws, pins, rivets, and/or the like), which may be used to couple the housing to other components of riser assembly 198, such as, for example, a flange of a pipe 206. As shown, a lower end 208 of inner cylindrical projection 30 may be configured to be coupled to other components of riser assembly 198, such as for example, an internal telescopic pipe 210. For example, in the depicted embodiment, lower end 208 of inner cylindrical projection 30 may be welded to internal telescopic pipe 210. In other embodiments, a lower end (e.g., 208) of a housing (e.g., 14), such as, for example, an inner cylindrical projection (e.g., 30) may be joined in any other suitable manner. In this embodiment, internal telescopic pipe 210 may be nested within an external telescopic pipe 214 such that the internal telescopic pipe and the external telescopic pipe are slidable relative to each other. Together, internal telescopic pipe 210 and external telescopic pipe 214 may compensate for the heave of riser assembly 198. As shown in FIG. 18, annular recess 38 of housing 14 may be configured to receive an upper end 218 of external telescopic pipe 214. In this embodiment, one or more engagement members 22 of apparatus 10 may be configured to engage upper end 218 of external telescopic pipe 214 such that the external telescopic pipe is (e.g., longitudinally and/or rotationally) fixed relative to internal telescopic pipe 210. For example, when engagement member(s) 22 are in the retracted position, upper end 218 of external telescopic pipe 214 may move into annular recess 38 of housing 14. Thereafter, while external telescopic pipe 214 is disposed in annular recess 38, engagement member(s) 22 may be moved to the extended position (e.g., as described above) where the engagement member(s) engage upper end 218 of the external telescopic pipe, thereby (e.g., longitudinally and/or rotationally) fixing the external telescopic pipe relative to internal telescopic pipe 210.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A connection device, comprising:
   a housing having a bore therethrough;
   a locking ring rotatably movable relative to the housing between a first position and a second position, the locking ring having a circumferential inner surface and a circumferential outer surface; and
   an engagement member laterally moveable relative to the bore of the housing between a retracted position and an extended position;
   where the locking ring is configured such that movement from the first position to the second position causes the engagement member to move from the retracted position to the extended position;
   where the engagement member is configured to:
      contact a portion of the circumferential outer surface of the locking ring to move the engagement member toward the retracted position; and
      contact a portion of the circumferential inner surface of the locking ring to move the engagement member toward the extended position.

2. The connection device of claim 1, where the portion of the circumferential inner surface of the locking ring includes a protrusion configured to engage the engagement member when the locking ring is in the second position and the engagement member is in the extended position.

3. The connection device of claim 2, where the portion of the circumferential outer surface of the locking ring includes a second protrusion configured to engage the engagement member when the locking ring is in the first position and the engagement member is in the retracted position.

4. The connection device of claim 1, where the engagement member is laterally movable through an opening defined by the housing.

5. The connection device of claim 1, where the housing includes: an inner cylindrical projection, an outer cylindrical projection, and an annular recess between the inner cylindrical projection and the outer cylindrical projection.

6. The connection device of claim 5, where, when the engagement member is in the retracted position, an end of the engagement member is configured to be substantially flush with an inner surface of the outer cylindrical projection.

7. The connection device of claim 5, where the housing includes a disc portion extending from the outer cylindrical portion.

8. The connection device of claim 1, where the engagement member includes a channel extending from a first side of the engagement member to a second side of the engagement member and the locking ring is configured to be movable within the channel when the locking ring moves between the first position and the second position.

9. The connection device of claim 8, where the engagement member includes an inner protrusion and an outer protrusion extending into the channel.

10. A connection device, comprising:
    a housing having a bore therethrough;
    a locking ring rotatably movable relative to the housing between a first position and a second position, where the locking ring includes a circumferential inner surface having an inner protrusion and a circumferential outer surface having an outer protrusion;
    an engagement member laterally moveable relative to the bore of the housing between a retracted position and an extended position;
    where, when the engagement member is in the retracted position, the engagement member is configured to engage the outer protrusion of the locking ring and, when the engagement member is in the extended position, the engagement member is configured to engage the inner protrusion of the locking ring.

11. The connection device of claim 10, where the locking ring is configured to be rotatably movable relative to a longitudinal axis of the housing.

12. The connection device of either claim 10, where the outer protrusion of the locking ring includes a sloped surface configured to engage the engagement member.

13. The connection device of claim 10, where the locking ring includes a toothed profile configured to mate with a gear.

14. An assembly, comprising:
a first pipe;
a second pipe;
a connection device configured to be coupled to the first pipe, the connection device comprising:
 a housing having a bore therethrough;
 a locking ring rotatably movable relative to the housing between a first position and a second position, the locking ring having a circumferential inner surface and a circumferential outer surface;
 an engagement member laterally moveable relative to the bore of the housing between a retracted position and an extended position; and
 where, the locking ring is configured such that:
  movement from the first position to the second position causes the circumferential inner surface of the locking ring to contact the engagement member to move the engagement member from the retracted position to the extended position, and,
  movement from the second position to the first position causes the circumferential outer surface of the locking ring to contact the engagement member to move the engagement member from the extended position to the retracted position; and
 where, when the engagement member is in the extended position, the engagement member is configured to couple the connection device to the second pipe.

15. The assembly of claim 14, where the first pipe is configured to be coupled to an upper end of the housing of the connection device.

16. The assembly of claim 15, further comprising a third pipe, where the third pipe is configured to be coupled to a lower end of the housing of the connection device.

17. The assembly of claim 16, where the second pipe and the third pipe are configured to be telescopic.

\* \* \* \* \*